United States Patent [19]

Patterson, Jr. et al.

[11] Patent Number: 5,564,844

[45] Date of Patent: Oct. 15, 1996

[54] AUTOMATIC KEYBOARD MOVING APPARATUS

[76] Inventors: John L. Patterson, Jr., 248 Earle Rd., Hewitt, Tex. 76643; Pat Pryor, 435 Elmwood Rd., Waco, Tex. 76712; William P. Mathews, Sr., 613 Richland, Waco, Tex. 76710

[21] Appl. No.: 350,235

[22] Filed: Dec. 6, 1994

[51] Int. Cl.$^6$ ........................................... B41J 5/16
[52] U.S. Cl. ............................. 400/492; 400/679
[58] Field of Search ........................... 400/492, 681, 400/680, 682, 679, 715, 492; 312/208.1; 248/118, 118.1–118.5, 917–923; 341/21, 22

[56] References Cited

U.S. PATENT DOCUMENTS

| | | | |
|---|---|---|---|
| 4,610,415 | 9/1986 | Miller | 248/455 |
| 4,781,126 | 11/1988 | Lochridge | 108/6 |
| 4,826,123 | 5/1989 | Hannah et al. | 248/248 |

Primary Examiner—Edgar S. Burr
Assistant Examiner—Anthony H. Nguyen
Attorney, Agent, or Firm—Konneker & Smith

[57] ABSTRACT

An apparatus for the automatic adjustment of the inclination angle of a keyboard during use by an operator. The unit operates by a motorized camshaft raising and lowering the back end of a hinged platform that supports a computer keyboard or other input device. The rate of change of the inclination angle and the inclination height are adjustable by the operator. The apparatus is useful in the prevention or alleviation of the effects of repetitive motion disease or carpal tunnel syndrome.

34 Claims, 3 Drawing Sheets

AUTOMATIC KEYBOARD MOVING APPARATUS

BACKGROUND OF THE INVENTION

1. Field of the Invention

The present invention relates generally to an apparatus for selectively changing the inclination angle of a keyboard during use by an operator, and more particularly, the invention concerns a method and apparatus by which the symptoms of carpal tunnel syndromes and other types of repetitive motion diseases may be reduced.

2. Description of the Related Art

Carpal tunnel syndrome is a condition of the hand which results in pain and discomfort and has been recognized and treated for many years. It is believed that certain occupations cause or aggravate carpal tunnel syndrome (Armstrong, 1983; Armstrong and Chaffin, 1979). Armstrong (1983) called it "one of a family of occupational illnesses". It is said that use of the hand with the wrist in certain static postures causes compression of the median nerve, and that occupations involving prolonged use of such postures can cause or worsen the condition (Armstrong, 1983; Brian et al. 1947; Tanzer, 1959).

To alleviate the effects of carpal tunnel syndrome, often the treatment involves taking anti-inflammatory medications, using wrist braces to restrict motion in the wrist, and, ultimately, surgery on the carpal tunnel. These treatments are directed to the treatment of the condition—not the prevention of its occurrence—and are not entirely satisfactory. Carpal tunnel syndrome occurring after repetitive motion does not generally respond well to the treatments useful for inflammatory or anatomic changes. It is believed that the proposed pathophysiology of the repetitive motion condition combined with prolonged repetitive flexion of the fingers against resistance (i.e., the keyboard) inhibits venous return from the fingers, causing edema within the carpal tunnel. As the compartmentalized edema increases, the hydrostatic pressure likewise increases, compromising the microvasculature of the median nerve. Symptoms of pain, proprioceptive dysfunction and, if left untreated, denervation muscular atrophy occur.

Most of the currently available devices to reduce carpal tunnel syndrome in keyboard operators consist of wrist supports or a padded rest to allow the operator to maintain their wrists in a more relaxed or static position while using the keyboard.

U.S. Pat. No. 4,402,624 to Stahl and Wachs discloses a keyboard that may be made incrementally adjustable between maximum and minimum inclination angles to suit individual operators. The keyboard assembly is adjusted by a hand operated mechanism that alters the inclination of the working face of the keyboard through a range of angles. The adjustment mechanism comprises a cam plate used as a support at the back of a keyboard. The cam plate has variable settings arrived at by rotation of an adjustment shaft, which in turn is operated by a series of gear members driven from a control shaft.

U.S. Pat. No. 4,773,783 to Dickie discloses a keyboard adjusting mechanism that has an attitude adjusting mechanism comprising a shaft extending lengthwise along the rear inside of the case and two legs mounted at the extremities of the shaft. The shaft is indexed to various index positions, which set the attitude of the keyboard.

U.S. Pat. No. 5,101,736 to Bommarito et al. discloses an adjustable desk having among its components a centrally located motorized platform adapted to support a keyboard. The platform may be adjusted over a wide range, and comprises three planar sections stacked on top of each other. The two lower sections are hinged to one another along their front edge, while the top section is slidably connected to the middle section. A motor and threaded screw is coupled to the middle section so that it may be tilted relative to the bottom section, giving the keyboard platform motorized tilt adjustment.

U.S. Pat. No. 5,041,770 to Seiler et al. discloses an apparatus for adjusting a keyboard vertically up and down, or pivotally. The pivotal adjustment mechanism permits the keyboard support to be adjusted about a substantially horizontal axis. These adjusting mechanisms are electrically controlled by the computer user. The disclosure also describes an adjustable wrist support. One object of this invention is to provide relief from repetitive tasks that would cause carpal tunnel syndrome.

U.S. Pat. No. 5,145,270 to Darden discloses a reverse sloped keyboard that allows users to rest their wrists on the adjacent edge of the keyboard while typing. An object of the invention is to avoid carpal tunnel syndrome by having the keys arranged in tiers descending in a stepwise fashion toward the lower rear edge of the keyboard.

There thus exists a need in the workplace to prevent the occurrence of work-related musculoskeletal disorders that are related to performance of the same motions or motion pattern every few seconds for extended periods of time. Keyboards and keyboard supports available today provide only a fixed inclination angle that may be adjusted manually or by electric means prior commencement of operations. These devices do not provide for a means by which an operator may preset the parameters affecting the inclination angle of the keyboard, and have that angle change automatically while the operator is working.

SUMMARY OF THE INVENTION

The present invention seeks to overcome the drawbacks inherent in the prior art by providing an apparatus that is capable of automatically and continuously varying the inclination angle of a keyboard relative to the position of an operator's wrists, either by slowly and continuously changing the inclination angle, or by means such as a timer, that operates in a discontinuous manner to change the inclination angle at set periods of time while the operator is working. This slow but constant motion allows the wrists to remain in motion, promoting circulation and reducing swelling in the carpal tunnel area. Due to the slow motion of the keyboard, operator speed and efficiency are not impaired. By providing continuous active flexion and extension of the wrist during the work period, venous return is enhanced and a constant massage of the carpal tunnel itself prevents the accumulation of edema and hence increased hydrostatic pressure.

A further object of the present invention is to provide sufficient active motion of flexion extension to prevent the neuropathy of carpal tunnel syndrome, as well as removing the necessity for the "exercise breaks" that are now recommended for prevention of the syndrome. This prevents recurrence of the carpal tunnel syndrome and possibly enhances productivity.

Further features allow the operator the option of customizing the period and rate of change of inclination angle and the maximum and minimum angles to suit their individual needs. The operator may also set the keyboard to operate in an automatic but discontinuous manner by using a device such as a timer that activates the mechanism that changes the inclination angle for set intervals.

The variable elevating keyboard device is a self-contained unit that may operate by means of a motorized camshaft. Any standard keyboard may be placed on top of the device, which raises and lowers the upper or back edge of the keyboard from zero to approximately one and one-half inches in a vertical direction, constantly changing the position of the operator's wrist. The amount of elevation may be determined by a cam system, and may be customized to each individual operator. The speed of the change in elevation can also be adjusted for optimal efficiency by the operator, enabling complete control of the keyboard operation.

In current embodiments, the variable elevating device is made of two flat, substantially rigid surfaces that are hinged together on the long bottom edge. Cams are mounted between the two surfaces, and a motor connected to a common cam shaft rotates the cams to activate the system. As the cams turn, the unhinged back edge of the top surface is raised in a vertical direction, thus changing the angle of the keys of the keyboard relative to the operator's wrist. The rate of rotation of the cams, as well as the time between changes of this inclination angle may be regulated by the operator. Since the keyboard may sit on top of the device, switching from one keyboard to another may be made without difficulty.

The slowly rotating, motorized shaft with attached cams serves to raise and lower the keyboard platform automatically and continuously from approximately 0 to 1½ inches in a vertical direction from the back of the keyboard, thus constantly changing the position of the wrists relative to the inclination angle of the keyboard. The electric motor that rotates the shaft is connected to suitable gearing that regulates the speed of rotation of the shaft and cams. The amount of elevation is determined by the cam system, and is designed to be customized by each individual operator. Additionally, using the controller, the rate of change of the inclination angle is also adjustable by the operator, ranging, for example, from 1/10 cycles per minute to 5 cycles per minute. These customized adjustments allow for the operator to control the device parameters for optimal efficiency. It is recognized that the base support for a keyboard is easily adapted and customized to the shape of the keyboard design. Keyboards may be easily interchanged without requiring changes or modifications of the actuators or elevator.

In alternative embodiments of the invention, the inclination angle of the keyboard may be changed in a discontinuous, stepwise manner by controlling the duration of cam rotation. The rate of rotation is regulated by a timer that is part of the controller. In this manner, the cam may be rotated for a protracted period of time, followed by a defined period of no rotation or rest, which is then followed by another period of rotation. In this manner, the change in the inclination angle of the keyboard is accomplished discontinuously but automatically, requiring no input or adjustment from the operator other than performing the initial settings. Therefore, the controller may be used to control not only the frequency of the keyboard support movement, but the duration of the keyboard support at each inclination angle.

As used herein, the term "automatically" refers to movement of the keyboard support surface in either a continuously or discontinuously manner, following activation by the operator. In certain embodiments, the operator need only set the rate at which the inclination angle is changed. In other embodiments, a timing mechanism is used to set the amount of time that the keyboard surface remains at a particular inclination angle, followed by movement to a different angle. In the embodiments described herein, the operator need only make the required initial inputs to the controller, to adjust the apparatus for individual performance characteristics, and to activate the apparatus. Following activation, the apparatus can be said to operate automatically, since it requires no further inputs from the keyboard operator during normal use.

Different actuators or jacking mechanisms for raising and lowering the keyboard support, and thus changing the inclination angle relative to the operator's wrists are contemplated in addition to the cam and shaft system described herein. For example, it is envisioned that a lever arrangement actuator connected to an electric motor may allow raising and lowering of the platform holding the keyboard. Alternatively, a mechanical arrangement operating on a ratchet type basis that changes the angle of the board in response to pressure from the operator's keystrokes is envisioned. In this regard, a ratchet and pawl mechanism may be used, controlled by an electric motor. Additional actuators may include, without limitation, an electromechanical type system operating through variable solenoids, step-motors, electric motors connected to screws, and the like. It will be recognized that there may be other mechanisms that allow automatic adjustment of the inclination angle of a keyboard relative to the operator's wrists during use by that operator and, as such, are contemplated to be within the scope of the present invention. For example, the jacking mechanism may be manually driven, operating by the motion of the operator's fingers on the keyboard, or other pressure sensing mechanism. The rate of change of the inclination angle, as well as the overall inclination angle will be easily set by a controller programmable to operate the actuator or the jacking mechanism to tilt the keyboard between positions.

It is also envisioned that the actuator or elevator for changing the inclination angle of the keyboard may become an integral part of new keyboards, such that the actuator and keyboard are part of a unitized device. In some embodiments, a cam actuator coupled to an electric motor is used to elevate the back end of the keyboard, while in other embodiments, a series of step motors may be employed to change the keyboard inclination angle. The power source for the actuator motor may be from the computer via the keyboard connection, from an internal or battery source, or it may be from an external source. The unitized automatic keyboard may be automatically controlled from an internal controller that adjusts the rate of cam rotation to a value set by the individual operator, from an external controller, or the controller may alternatively be through the use of computer software that is capable of setting the rotation rate of the cams. The operator may also control the amount of time that the keyboard surface remains at a particular inclination angle, then followed by movement to a different angle, by utilizing a controller that is external to the keyboard or internal within the single unit or unitized keyboard. Alternatively, the controller may be a programmable controller, such as software in a computer that is operably connected to the keyboard and that can affect the rate or time of inclination of the keyboard, without the necessity of external controls. For example, the number of operator keystrokes may be linked to the period and rate of change of the keyboard angle or other variables that can be selected by the individual operator.

It is contemplated that any keyboard arrangement will be suitable for use with the present invention. For example, ten key adding machines and other calculating type devices, as well as court reporter stenographic machines are contemplated to be covered within the scope of this patent. It is further contemplated that the apparatus and methods disclosed herein apply to any work surface on which repetitive hand tasks are performed. For example, it is envisioned that these methods and devices will be useful in factory settings where manual hand labor is used, for example, in assembly processes.

Other methods of moving a work surface are also contemplated to be within the scope of the invention. For example, a keyboard or work surface that is inclined forward from the operator may function by raising and lowering the forward edge of the surface to change the inclination angle in a manner similar to moving the back edge of the surface. In each case, the movement of the surface causes a change in the inclination angle of the work surface relative to the operator's wrists, maintaining the wrists in motion.

It is recognized that a skilled artisan may adapt the devices and methods disclosed herein to be useful in therapy situations. For example, a therapeutic exercise device may be constructed, independent of a keyboard, for the treatment of carpal tunnel syndrome. In such embodiments, the apparatus may provide greater ranges of movement or elevation, and may be attached to the patient in such a manner so as to move the wrist automatically through a preset range of motion. The range of movement, as well as the continuous or discontinuous time of movement may be set by the operator. Other devices may be constructed that do not attach to the patient, but interact with the patient to promote wrist flexion.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein. Like reference numerals designate identical or corresponding parts throughout the several views presented.

DETAILED DESCRIPTION OF THE PREFERRED EMBODIMENT

Figure 1:
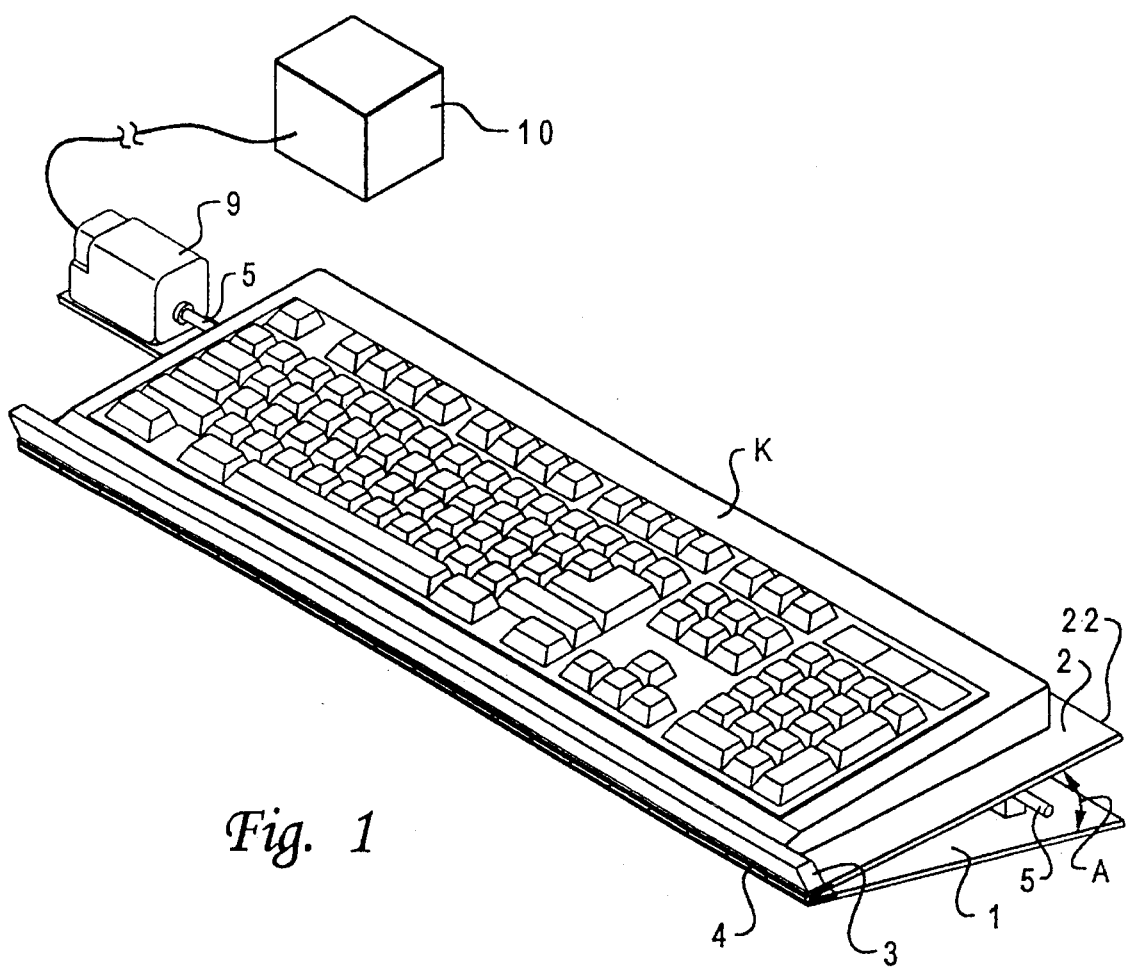
FIG. 1. Perspective view of the continuous motion keyboard apparatus.

Referring to FIG. 1, the keyboard apparatus of the present invention may include a base 1 that is substantially rectangular in shape. A similarly shaped keyboard support surface 2 is hingedly connected to the base 1 by means of hinge 4. A standard keyboard K may be placed upon the upper surface of keyboard support 2 and is prevented from sliding off by means of stop 3. The unhinged longitudinal side edge 22 of the keyboard support surface 2, closest to the top side edge of the keyboard K, is moved up and down, thereby changing the inclination angle A of the keyboard, by means of electric motor 9 operably connected to elongated shaft 5.

Figure 2:
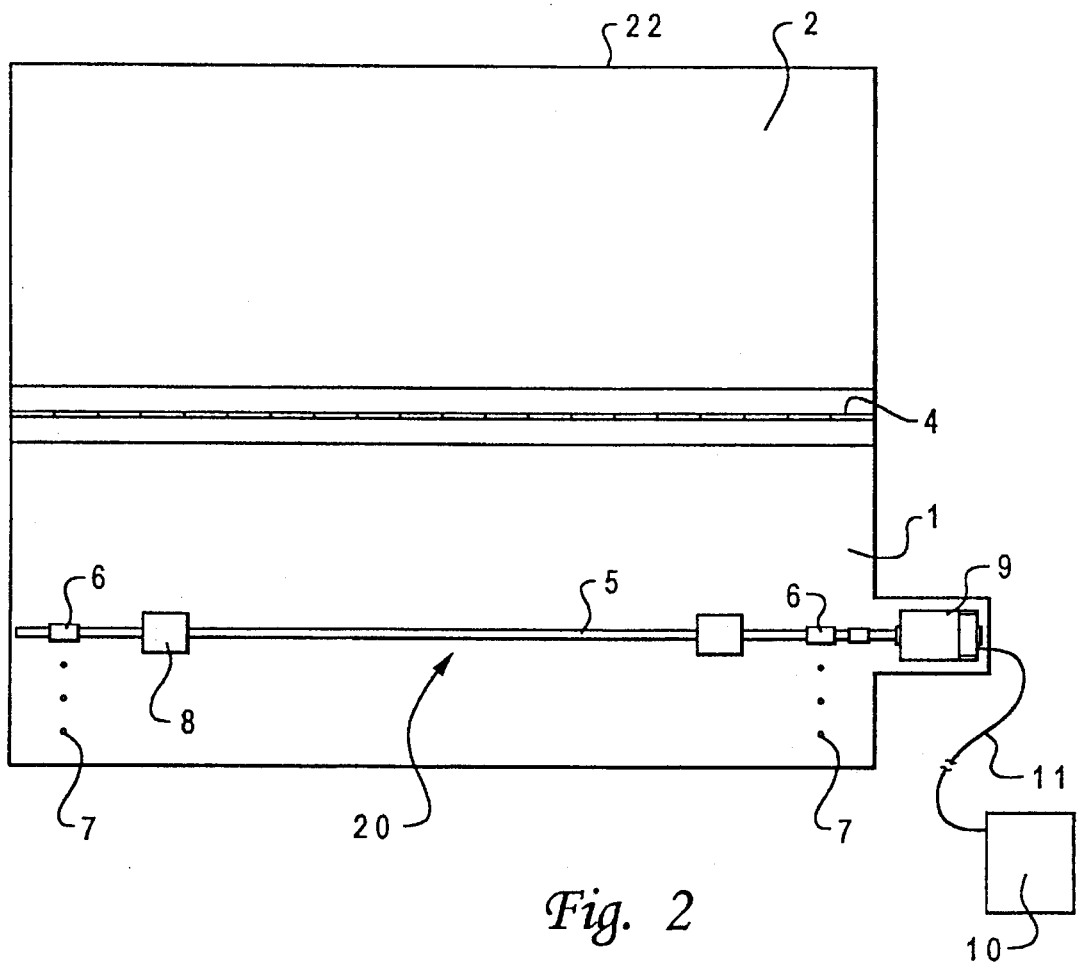
FIG. 2. Top view of the keyboard apparatus with the keyboard support opened.

Referring to FIG. 2, base 1 is seen attached to keyboard support 2 by means of hinge 4. In the view of FIG. 2, the keyboard support 2 is rotated about hinge 4 so that the support moving mechanism 20 may be clearly seen. Electric motor 9, connected to base 1, selectively rotates elongated shaft 5 that is supported on base 1 by means of bearing supports 6. The bearing supports are secured to the base by any suitable attachment means such as, for example and without limitation, screws, adhesive, or welding.

Figure 3:
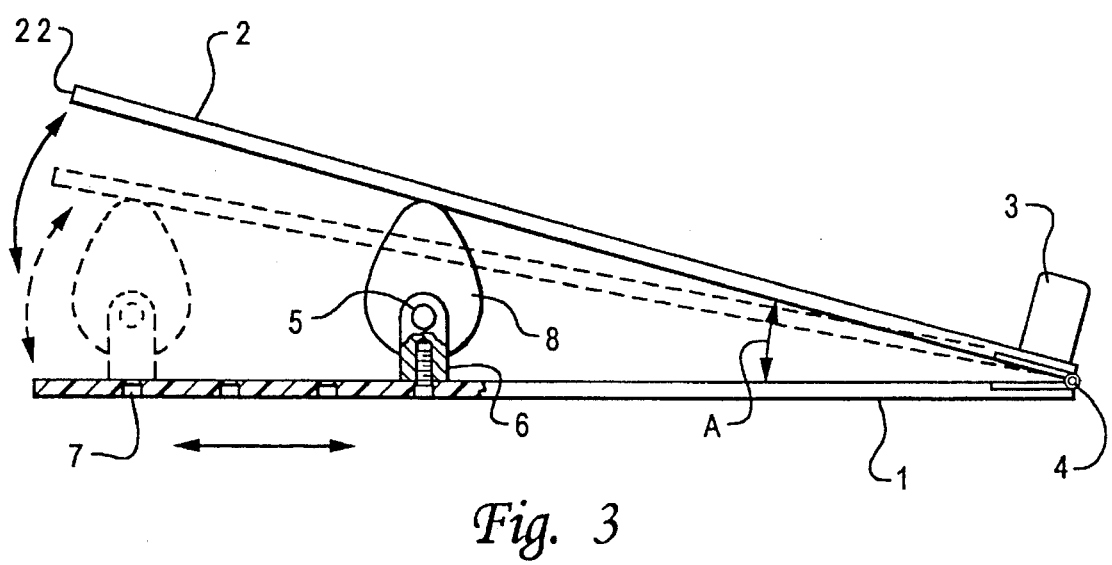
FIG. 3. Side view of the keyboard apparatus showing the range of motion of the keyboard support at different cam positions.

Mounted securely on the elongated shaft 5 are eccentric cams 8 that contact the lower surface of keyboard support 2, when it is rotated about hinge 4 from the depicted open position of FIG. 2 to the closed position depicted in FIG. 3. The cams 8 are fixed to the shaft 5 such that they are rotated when the shaft 5 is rotated. Due to the eccentric shape of the cam 8, the keyboard support 2 is pivoted about hinge 4 when shaft 5 is rotated, resulting in side edge 22 being raised or lowered with respect to base 1, thereby altering the inclination angle. The term "inclination angle" is intended to describe the angle (designated angle A in FIG. 3) formed between base 1 and support 2 as designated. As the cam continues to rotate, the inclination angle will decrease.

The minimum and maximum limits of inclination angle A of the keyboard support 2 with base 1 may be adjusted by repositioning bearing supports 6 and electric motor 9, close to or spaced more from hinge 4 between base 1 and keyboard support 2, and securing supports 6 into new positions depicted by alternative position holes 7. It can be understood that alternative means are available for repositioning supports 6, for example and without limitation, slidably mounting supports 6 in grooves formed in base 1 such that supports may be easily and selectively repositioned. The maximum inclination angle is limited by the degree of eccentricity provided by each cam 8 and the position of the bearing supports 6 in relation to hinge 4. It is contemplated that the range of motion of the keyboard will be from an inclination angle of approximately 0 degrees to approximately 35 degrees, although the maximum angle can be somewhat larger.

Referring now to FIG. 3, a side view is shown of keyboard support 2 attached to base 1 by means of hinge 4 elevated to a maximum angle of inclination A. As can be understood, stop 3 prevents a keyboard or other unit from sliding off the lower edge of the keyboard support 2. Bearing supports 6 rotatably support elongated shaft 5. Cam 8 is mounted on elongated shaft 5 and securably fastened thereto by such means as a lockscrew, friction fit or the like. Due to the eccentric shape of the cam 8, the side edge 22 of the keyboard support 2 may be raised and the angle of inclination A increased when cam 8 is rotated such that the elongated lobe is at the depicted uppermost position shown in FIG. 3. Rotating the cam 8 to the minimum position with the shortened portion of cam 8 contacting support 2, lowers edge 22 of keyboard support 2 to its minimum angle of inclination.

The rate of changing the inclination angle A of the keyboard surface 2 may be regulated in one embodiment of the present invention by controlling the speed of the motor 9 as it turns the shaft 5. In certain embodiments, the speed of rotation of the shaft 5 typically may be between about 0.5 and about 5 revolutions per minute (RPM). Most preferably, the rate at which the keyboard platform 2 moves is controlled by the operator by means of controller 10 (FIG. 2).

The controller 10 for adjusting the rotation rate of the elongated shaft 5 may be a standard rheostat typically used to control the speed of a DC electric motor, or a variac used to control an AC motor. Alternatively, a standard timer mechanism (not shown) may be used to control the rotation rate of motor 9 in a stepwise manner. Other similar controllers familiar to those skilled in the art are contemplated to be within the scope of the present invention.

Figure 4:
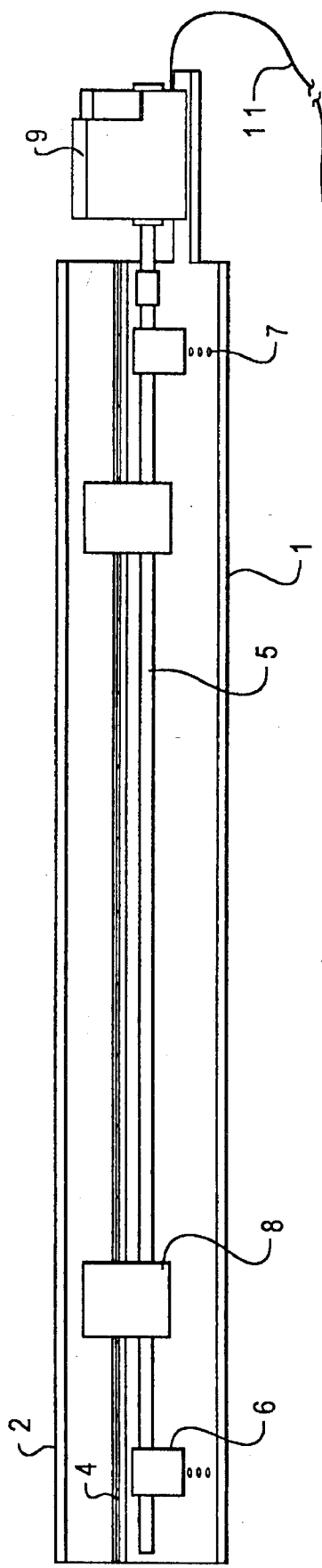
FIG. 4. Rear view showing the cams interacting with the keyboard support.

Referring now to FIG. 4, a rear view of the apparatus depicts keyboard support 2 connected to base 1 by means of hinge 4. Bearing supports 6 rotatably support elongated shaft 5 having cams 8 attached thereto. Keyboard support 2 rests upon the upper most surfaces of cams 8 as shown in FIG. 3. Motor 9 is operatively connected to shaft 5, such that shaft 5 may be rotated by motor 9. Controller 10 is connected to motor 9 by means of cable 11 for example. To change the range of the inclination angle A of the keyboard support 2, the distance between hinge 4 and bearing supports 6 and motor 9 may be adjusted by repositioning supports 6 in position holes 7.

Figure 5:
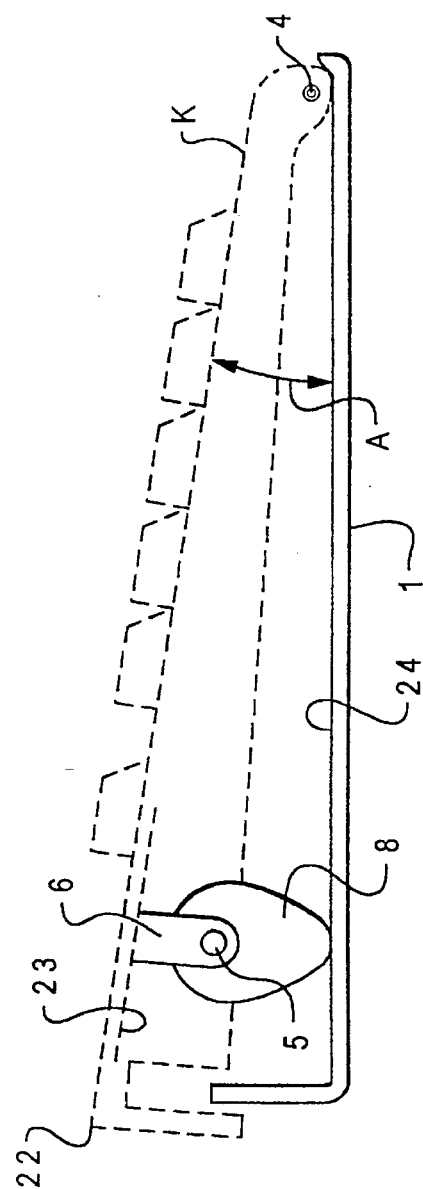
FIG. 5 Side view of the unitized keyboard apparatus showing the location of the cams and the case arrangement.

FIG. 5 shows the automatic keyboard inclination apparatus as a single unit. Base 1 is attached to upper keyboard housing K by hinge 4. Bearing supports 6 rotatably support elongated shaft 5 and are attached to lower surface 23 of keyboard K. Cam 8 is mounted on elongated shaft 5 and securely fastened thereto by such means as a lockscrew, friction fit or the like. The eccentric cam 8 contacts top surface 24 of base 1. Rotation of cam 8 causes keyboard K to be raised and the angle of inclination A increased when the elongated lobe is at the depicted uppermost position shown in FIG. 5. Rotating the cam 8 to the minimum position with the shortened portion of cam 8 contacting support top surface 24 of base 1, lowers edge 22 of keyboard K to its minimum angle of inclination.

As can be understood, the apparatus of the present invention provides a surface upon which a standard keyboard may be supported, with the angle of inclination being varied as the keyboard is being used. For example, as the operator is using the keyboard, motor 9 is continually rotating shaft 5 and cams 8 such that the surface 2 is continuously being raised and lowered through a range of inclination angles. This range is determined by the position of supports 6 and the size and shape of cams 8. Also the rate of this change of inclination angle can be adjusted by adjusting the rate of rotation of motor 9 as previously explained.

The apparatus and methods disclosed and claimed herein can be made and executed without undue experimentation in light of the present disclosure. While the apparatus and methods of this invention have been described in terms of preferred embodiments, it will be apparent to those of skill in the art that variations may be applied to the apparatus, methods and in the steps or in the sequence of steps of the method described herein without departing from the concept, spirit and scope of the invention. All substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

Armstrong, T. J., "Ergonomics Guides: An ergonomics guide to carpal tunnel syndrome", American Industrial Hygiene Association, (1983).

Armstrong, T. J. and Chaffin, D. B., *J. Occupational Med.*, 21:481–486 (1979).

Brain, W. R., Wright, A. D. and Wilkinson, M., *Lancet*, 1:277–282 (1947).

Tanzer, R. C., *J. Bone and Joint Surgery*, 41A:626–634 (1959).

What is claimed is:

1. Keyboard moving apparatus, comprising:

a base having a top side surface and a peripheral edge;

a keyboard support having a top side surface, a bottom side surface, and a peripheral edge;

a hinge attached to said base peripheral edge and said keyboard support peripheral edge, said hinge permitting pivoting movement of said keyboard support relative to said base; and means to automatically and continuously pivot said keyboard support relative to said base, said pivot means including a support moving mechanism attached to said base top side surface, said support moving mechanism including a motor, a shaft rotatable by said motor, a bearing support rotatably attaching said shaft to said base, a cam carried by said shaft and contacting said keyboard support bottom side surface, and a controller, whereby said cam, rotated by said shaft, automatically pivots said keyboard support relative to said base.

2. The keyboard moving apparatus according to claim 1, wherein said controller is electrically attached to said motor, said controller being capable of regulating a speed of said motor, and said controller being adjustable by a user of the apparatus.

3. The keyboard moving apparatus according to claim 1, wherein said controller is electrically attached to said motor, said controller being capable of regulating a period of continuous motion of said motor, and said controller being adjustable by a user of the apparatus.

4. The keyboard moving apparatus according to claim 1, wherein said base peripheral edge extends longitudinally along said base and said shaft is in a parallel, spaced-apart relationship to said base, such that said cam rotates in a first plane orthogonal to a second plane defined by said base.

5. The keyboard moving apparatus according to claim 1, further comprising a keyboard disposed on said keyboard support.

6. The keyboard moving apparatus according to claim 1, further comprising a keyboard integrally formed with said keyboard support.

7. Apparatus, comprising:

a keyboard having a top side surface with a plurality of keys disposed thereon, a bottom side surface, and a peripheral edge;

a base having a top side surface and a peripheral edge;

a hinge pivotably attaching said keyboard peripheral edge to said base peripheral edge; and means to automatically and continuously pivot said keyboard relative to said base, said pivot means including a keyboard moving mechanism attached to said keyboard bottom side surface, said keyboard moving mechanism including a shaft, a motor attached to and automatically rotating said shaft, a cam attached to said shaft and being rotated thereby, said cam contacting said base top side surface to pivot said keyboard relative to said base, and a controller, whereby said keyboard automatically pivots relative to said base as said motor rotates said shaft.

8. The keyboard moving apparatus according to claim 7, wherein said controller is electrically attached to said motor, said controller being capable of regulating a speed of said motor, and said controller being adjustable by a user of the apparatus.

9. The keyboard moving apparatus according to claim 7, wherein said controller is electrically attached to said motor, said controller being capable of regulating a period of continuous motion of said motor, and said controller being adjustable by a user of the apparatus.

10. The keyboard moving apparatus according to claim 7, wherein said keyboard peripheral edge extends longitudinally along said keyboard and said shaft is in a parallel, spaced-apart relationship to said keyboard, such that said cam rotates in a first plane orthogonal to a second plane defined by said keyboard bottom side surface.

11. A method of automatically changing an inclination angle of a keyboard relative to a generally horizontal support surface, the inclination angle changing while a user of the keyboard is using the keyboard, the method comprising the steps of:

providing a motor;

providing a shaft;

attaching said shaft to said motor;

activating said motor to rotate said shaft; and providing means for elevating the keyboard, in response to said step of activating said motor, to automatically and periodically change the inclination angle while the user uses the keyboard, said elevating means including a controller.

12. The method according to claim 11, further comprising the steps of:

providing a base having a generally planar top surface;

attaching said motor and said shaft to said base top surface;

providing hinge means; and attaching said hinge means to said base, such that the keyboard pivots about said hinge means when said elevating means changes the inclination angle.

13. The method according to claim 12, further comprising the steps of:

providing means for supporting the keyboard, said keyboard support means having a top side surface and a bottom side surface, said top side surface being capable of supporting the keyboard in a variable angular relationship to said base, and said bottom side surface contacting said elevating means; and attaching said keyboard support means to said hinge means.

14. The method according to claim 11, further comprising the steps of:

providing a base having a generally planar top surface;

attaching said motor and said shaft to the keyboard;

providing hinge means; and attaching said hinge means to said base and to the keyboard, such that the keyboard pivots about said hinge means when said elevating means changes the inclination angle.

15. The method according to claim 11, wherein said step of activating said motor further comprises activating said motor at a selected speed while the user is using the keyboard, and wherein said controller is capable of adjusting said selected speed, said controller being adjustable by the user.

16. The method according to claim 11, wherein said step of activating said motor further comprises activating said motor at a selected amount of time at a selected inclination angle, and wherein said controller is capable of adjusting said selected amount of time and said selected inclination angle, said controller being adjustable by the user.

17. The method according to claim 16, wherein said step of providing elevating means further comprises providing said controller capable of adjusting a speed of said motor.

18. Keyboard moving apparatus, comprising:

a base having a top side surface and a peripheral edge;

a keyboard support having a top side surface, a bottom side surface, and a peripheral edge;

a hinge attached to said base peripheral edge and said keyboard support peripheral edge, said hinge permitting pivoting movement of said keyboard support relative to said base; and means to automatically and periodically pivot said keyboard support relative to said base during use of said keyboard support, said pivot means including a support moving mechanism attached to said base top side surface, said support moving mechanism including a motor, a shaft rotatable by said motor, a bearing support rotatably attaching said shaft to said base, a cam carried by said shaft and contacting said keyboard support bottom side surface, and a controller, whereby said cam, rotated by said shaft, automatically pivots said keyboard support relative to said base.

19. The keyboard moving apparatus according to claim 18, wherein said controller is electrically attached to said motor, said controller being capable of regulating a speed of said motor, and said controller being adjustable by a user of the apparatus.

20. The keyboard moving apparatus according to claim 18, wherein said controller is electrically attached to said motor, said controller being capable of regulating a period of continuous motion of said motor, and said controller being adjustable by a user of the apparatus.

21. The keyboard moving apparatus according to claim 18, wherein said base peripheral edge extends longitudinally along said base and said shaft is in a parallel, spaced-apart relationship to said base, such that said cam rotates in a first plane orthogonal to a second plane defined by said base.

22. The keyboard moving apparatus according to claim 18, further comprising a keyboard disposed on said keyboard support.

23. The keyboard moving apparatus according to claim 18, further comprising a keyboard integrally formed with said keyboard support.

24. Apparatus, comprising:

a keyboard having a top side surface with a plurality of keys disposed thereon, a bottom side surface, and a peripheral edge;

a base having a top side surface and a peripheral edge;

a hinge pivotably attaching said keyboard peripheral edge to said base peripheral edge; and means to automatically and periodically pivot said keyboard relative to said base during use of said keyboard, said pivot means including a keyboard moving mechanism attached to said keyboard bottom side surface, said keyboard moving mechanism including a shaft, a motor attached to and automatically rotating said shaft, a cam attached to said shaft and being rotated thereby, said cam contacting said base top side surface to pivot said keyboard relative to said base, and a controller, whereby said keyboard automatically pivots relative to said base as said motor rotates said shaft.

25. The keyboard moving apparatus according to claim 24, wherein said controller is electrically attached to said motor, said controller being capable of regulating a speed of said motor, and said controller being adjustable by a user of the apparatus.

26. The keyboard moving apparatus according to claim 24, wherein said controller is electrically attached to said motor, said controller being capable of regulating a period of continuous motion of said motor, and said controller being adjustable by a user of the apparatus.

27. The keyboard moving apparatus according to claim 24, wherein said keyboard peripheral edge extends longitudinally along said keyboard and said shaft is in a parallel, spaced-apart relationship to said keyboard, such that said cam rotates in a first plane orthogonal to a second plane defined by said keyboard bottom side surface.

28. A method of automatically changing an inclination angle of a keyboard relative to a generally horizontal support surface, the inclination angle changing while a user of the keyboard is using the keyboard, the method comprising the steps of:

providing a motor;

providing a shaft;

attaching said shaft to said motor;

activating said motor to rotate said shaft; and providing means for elevating the keyboard, in response to said step of activating said motor, to automatically and continuously change the inclination angle while the user uses the keyboard, said elevating means including a controller.

29. The method according to claim 28, further comprising the steps of:

providing a base having a generally planar top surface;

attaching said motor and said shaft to said base top surface;

providing hinge means; and attaching said hinge means to said base, such that the keyboard pivots about said hinge means when said elevating means changes the inclination angle.

30. The method according to claim 29, further comprising the steps of:

providing means for supporting the keyboard, said keyboard support means having a top side surface and a bottom side surface, said top side surface being capable of supporting the keyboard in a variable angular relationship to said base, and said bottom side surface contacting said elevating means; and attaching said keyboard support means to said hinge means.

31. The method according to claim 28, further comprising the steps of:

providing a base having a generally planar top surface;

attaching said motor and said shaft to the keyboard;

providing hinge means; and attaching said hinge means to said base and to the keyboard, such that the keyboard pivots about said hinge means when said elevating means changes the inclination angle.

32. The method according to claim 28, wherein said step of activating said motor further comprises activating said motor at a selected speed while the user is using the keyboard, and wherein said controller is capable of adjusting said selected speed, said controller being adjustable by the user.

33. The method according to claim 28, wherein said step of activating said motor further comprises activating said motor at a selected amount of time at a selected inclination angle, and wherein said controller is capable of adjusting said selected amount of time and said selected inclination angle, said controller being adjustable by the user.

34. The method according to claim 33, wherein said step of providing elevating means further comprises providing said controller capable of adjusting a speed of said motor.

* * * * *